United States Patent [19]

Ishikawa et al.

[11] Patent Number: 5,772,305

[45] Date of Patent: Jun. 30, 1998

[54] SURFACE ILLUMINANT DEVICE

[75] Inventors: Tsuyoshi Ishikawa; Kayoko Watai, both of Kawaguchi, Japan

[73] Assignee: Enplas Corporation, Japan

[21] Appl. No.: 736,274

[22] Filed: Oct. 24, 1996

Related U.S. Application Data

[63] Continuation of Ser. No. 289,316, Aug. 11, 1994, abandoned.

[51] Int. Cl.⁶ .................................................. F21V 8/00
[52] U.S. Cl. .................................. 362/31; 362/26; 362/27
[58] Field of Search ................................ 362/26, 27, 31, 362/328, 307

[56] References Cited

U.S. PATENT DOCUMENTS 5,408,388  4/1995  Kobayashi et al. ..................... 362/31
5,450,292  9/1995  Yokoyama et al. ..................... 362/31

*Primary Examiner*—Stephen F. Husar
*Attorney, Agent, or Firm*—Graham & James LLP

[57] ABSTRACT

A surface illuminant device includes a light transmitter, light sources disposed adjacent to entrance ends of the light transmitter, and a reflecting sheet disposed below a lower surface of the light transmitter. The entrance ends of the light transmitter are configured as rough surfaces, and thereby unevenness of brightness of the surface illuminant device can be lessened.

2 Claims, 2 Drawing Sheets

SURFACE ILLUMINANT DEVICE

This is a continuation of application Ser. No. 08/289,316 filed on Aug. 11, 1994, now abandoned.

BACKGROUND OF THE INVENTION

1. Field of the Invention

This invention relates to a surface illuminant device with a light transmitter, used as a backlight for liquid crystal displays or the like.

2. Description of the Prior Art

FIG. 1 shows an example of the structure of a conventional surface illuminant device using a light transmitter. In this figure, reference numeral 1 represents a light transmitter made of acrylic resin for instance, 2 represents linear light sources such as cold-cathode tubes, 3 represents a reflecting sheet disposed on the side of a lower surface 1b of the light transmitter 1, and 4 represents a diffusing sheet situated on the side of an exit surface 1c of the light transmitter 1. Light emitted from the light sources 2 is incident on the light transmitter 1 through entrance ends 1a of the light transmitter 1. While traveling through the light transmitter 1, the light is transmitted through the lower surface 1b of the light transmitter 1 and reflected by the reflecting sheet 3 disposed below the lower surface 1b, or by the inner surface of the light transmitter 1. The incident light is thus attenuated and emerges from the exit surface 1c of the light transmitter 1. Furthermore, the light is transmitted through the diffusing sheet 4 situated above the exit surface 1c of the light transmitter 1, thereby becoming diffused light.

The light transmitter 1 shown in FIG. 1, however, is designed so that the lower surface 1b is configured as an inclined surface which approaches the exit surface 1c in going from the entrance ends to the center. Consequently, part of the light emitted from the light sources 2 is transmitted through the entrance ends 1a, is reflected directly from the lower surface 1b of the light transmitter 1, and emerges from the exit surface 1c as it is.

Since the light following such a path is little attenuated in the light transmitter 1, its brightness is extremely higher than that of any other light emerging from the exit surface 1c, and is not very low even when the light is transmitted through the diffusing sheet 4. This fact forms one of causes for unevenness of brightness of the surface illuminant device.

For the foregoing, when a light transmitter, for example, made of acrylic resin is used and the lower surface 1b is inclined at an angle of at least 2° with the exit surface 1c, uneven brightness can be ascertained with the naked eye. In general, as shown in FIG. 2, such uneven brightness, namely stripes of light 5 parallel to the light sources 2, are seen with the naked eye on both sides of the exit surface 1c close to the light sources 2.

SUMMARY OF THE INVENTION

It is, therefore, an object of the present invention to provide such a surface illuminant device including a light transmitter whose lower surface is inclined to approach the exit surface in going from the entrance ends to the center, as to allow less light, out of emitted light from the light sources, to be directly introduced to the lower surface of the light transmitter after being transmitted through the entrance ends of the same, thereby unevenness of brightness at the exit surface of the light transmitter being lessened.

In order to achieve this object, the surface illuminant device according to the present invention is constructed so that the entrance ends of the light transmitter have rough surfaces.

By taking the entrance ends of the light transmitter as rough surfaces, the light emitted from the light sources is diffused upon transmission through the entrance ends, and enters the light transmitter. Hence, the amount of light directed toward the lower surface of the light transmitter immediately from the light sources is decreased. The light directed toward the lower surface immediately, which is also diffused by the entrance ends, strikes the lower surface at various angles. Thus, the amount of light directed toward the exit surface immediately, of the light reflected by the lower surface, is also decreased. Further, since the light directed toward the exit surface immediately, of the reflected light, is also diffused by the entrance ends, it emerges from the exit surface in a diffused state. Consequently, the unevenness of brightness becomes less than that of the conventional device.

This and other objects as well as the features and advantages of the present invention will become apparent from the following detailed description of the preferred embodiment when taken in conjunction with the accompanying drawings.

DETAILED DESCRIPTION OF THE PREFERRED EMBODIMENT

Figure 1:
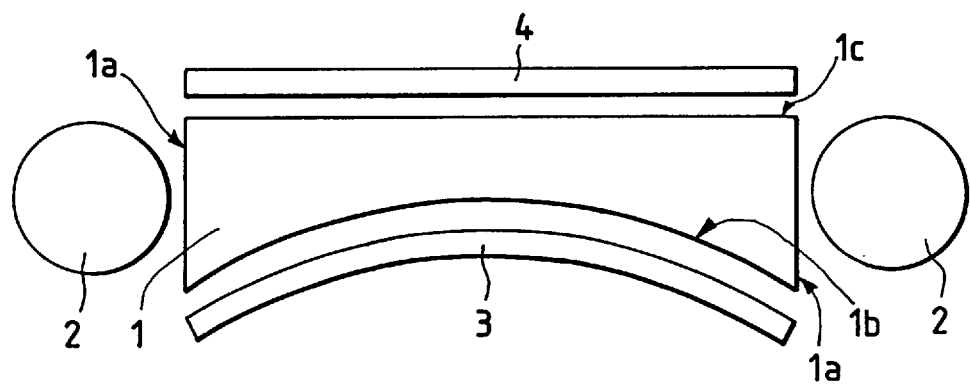
FIG. 1 is a side view showing an example of the structure of a conventional surface illuminant device using a light transmitter.

Referring to the drawings, the embodiment of the surface illuminant device according to the present invention will be explained below.

Figure 3:
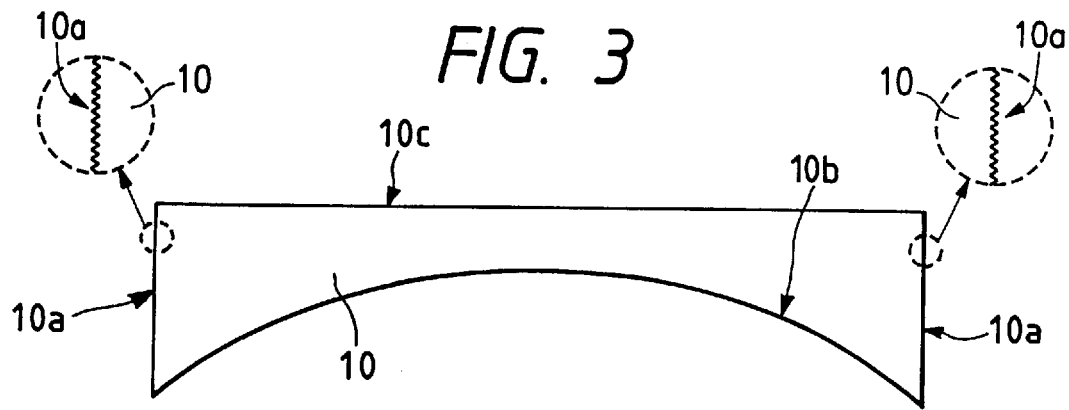
FIG. 3 is a side view showing a light transmitter in one embodiment of a surface illuminant device according to the present invention.

FIG. 3 shows the light transmitter in one embodiment of the present invention. In this figure, reference numeral 10 denotes a light transmitter, 10a denotes entrance ends composed of rough surfaces with a surface roughness of 1 μm, 10b denotes a lower surface, and 10c denotes an exit surface.

Figure 2:
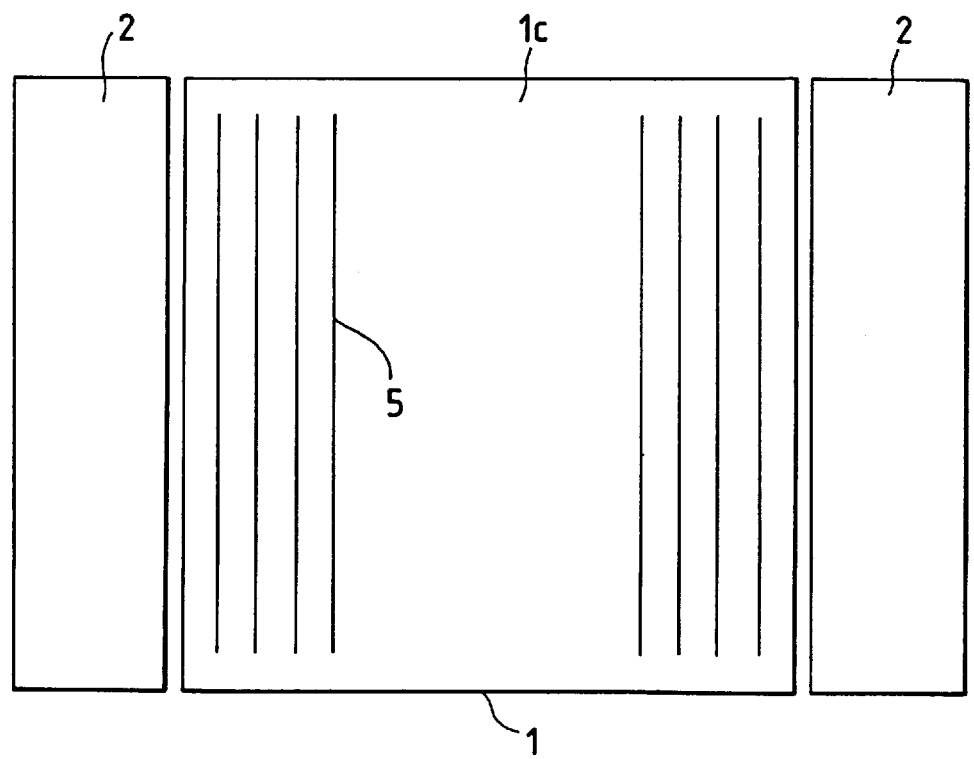
FIG. 2 is a plan view showing a state where stripes of light are seen on the exit surface of the light transmitter of the surface illuminant device in FIG. 1.

When the light transmitter 10 is used in the surface illuminant device of such a structure as shown in FIG. 1, light emitted from the light sources 2 is diffused upon transmission through the entrance ends 10a, and enters the light transmitter 10. The incident light thus travels in various directions inside the light transmitter 10. Hence, the amount of light directed toward the lower surface 10b immediately from the light sources 2 is small compared with that of the conventional device. The light directed toward the lower surface 10b immediately, which is also diffused by the entrance ends 10a, strikes the lower, surface 10b at various angles, and thus the amount of light directed toward the exit surface 10c immediately, of the light reflected by the lower surface 10b, is also small compared with that of the conventional device. Further, since the light directed toward the exit surface 10c immediately, of the reflected light, is also diffused by the entrance ends 10a, it emerges from the exit surface 10c in a diffused state. Consequently, the stripes of light 5 shown in FIG. 2 will not be seen with the naked eye, and the unevenness of brightness is less, over the whole of the exit surface 10c, than that of the conventional surface illuminant device.

Figure 4:
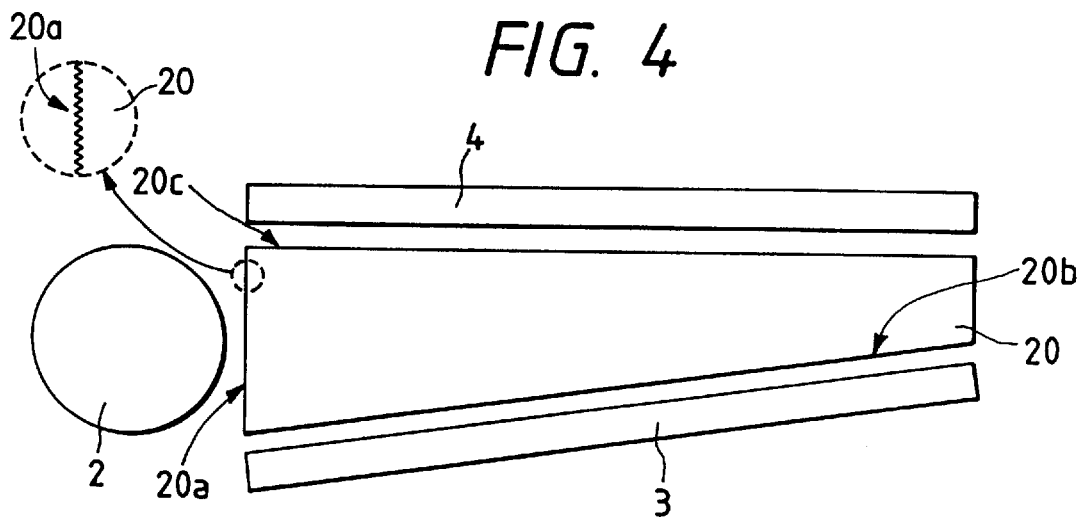
FIG. 4 is a side view showing an example of the structure of the surface illuminant device using another light transmitter in the present invention.
Figure 5:
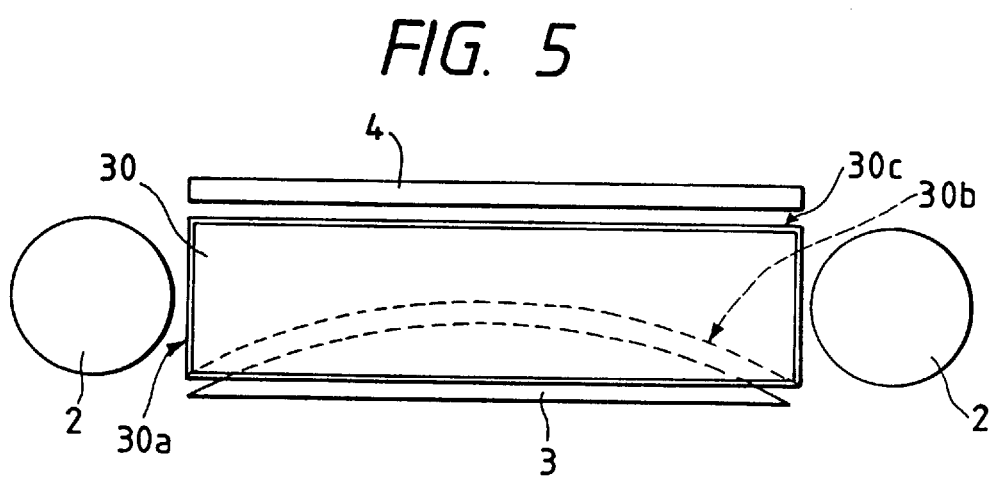
FIG. 5 is a side view showing an example of the structure of the surface illuminant device using still another light transmitter in the present invention.

The present invention is not limited to the surface illuminant device with the light transmitter mentioned above, and is applicable to a single-light surface illuminant device in which the light source 2 is disposed adjacent only to one side of a light transmitter 20 such as is shown in FIG. 4 and a four-light surface illuminant device in which the light sources 2 are situated adjacent to four sides of a light transmitter 30 such as in FIG. 5.

Also, it is desirable that the surface roughness of each of the entrance ends 10a, 20a, and 30a has the value of 1 μm or less which has been experimentally verified. Beyond this value, the diffusion effect of light will be materially lessened.

The light transmitter used in the surface illuminant device according to the present invention is also used as a scattering light transmitter as well as an ordinary transparent body. Any light transmitter may have shape such as a wedge, or concave curved surface.

What is claimed is:

1. A surface illuminant device comprising:

a light transmitter having an upper surface acting as an exit surface, a lower surface, and a single entrance end face substantially perpendicular to said exit surface;

a single linear light source disposed adjacent to said entrance end face of said light transmitter; and a reflecting sheet disposed below said lower surface of said light transmitter, wherein said light transmitter is constructed so that said lower surface thereof is inclined to approach said exit surface thereof in going from said entrance end face thereof to another end face thereof opposite to said entrance end face, such that the thickness of said light transmitter gradually decreases in going from said entrance end face to said another end face, and wherein said entrance end face of said light transmitter is a rough surface for diffusing light entering therein.

2. A surface illuminant device according to claim 1, wherein said lower surface of said light transmitter is shaped so as to include a plane face.

* * * * *